United States Patent
Moore

(10) Patent No.: US 10,413,791 B2
(45) Date of Patent: Sep. 17, 2019

(54) CONNECTION DEVICE

(75) Inventor: Simon Gary Moore, Cambridge (NZ)

(73) Assignee: PUKU LIMITED, Cambridge (NZ)

( * ) Notice: Subject to any disclaimer, the term of this patent is extended or adjusted under 35 U.S.C. 154(b) by 1238 days.

(21) Appl. No.: 12/863,182

(22) PCT Filed: Jan. 20, 2009

(86) PCT No.: PCT/NZ2009/000002
§ 371 (c)(1),
(2), (4) Date: Jul. 8, 2011

(87) PCT Pub. No.: WO2009/091266
PCT Pub. Date: Jul. 23, 2009

(65) Prior Publication Data
US 2011/0306438 A1 Dec. 15, 2011

(30) Foreign Application Priority Data
Jan. 17, 2008 (NZ) ........................ 565200

(51) Int. Cl.
*A63B 60/00* (2015.01)
*A63B 53/00* (2015.01)
(Continued)

(52) U.S. Cl.
CPC ............ *A63B 60/00* (2015.10); *A63B 53/007* (2013.01); *B62K 19/24* (2013.01); *F16B 7/1481* (2013.01); *F16L 37/05* (2013.01); *A45B 2009/005* (2013.01); *A63B 53/00* (2013.01); *A63B 53/14* (2013.01); *A63B 60/22* (2015.10);
(Continued)

(58) Field of Classification Search
CPC ................................. F16L 37/05; F16L 33/22
USPC ............ 285/322, 330, 331, 382, 382.2, 298; 403/292, 296, 297, 298, 309, 310, 311, 403/314, 62, 438, 425; 411/438, 425, 62; 138/109, 155; 29/525.01; 267/154, 155, 267/157, 168
See application file for complete search history.

(56) References Cited

U.S. PATENT DOCUMENTS 809,880 A * 1/1906 Woolldridge et al. ........ 403/206
1,829,657 A 10/1931 Jones
(Continued)

FOREIGN PATENT DOCUMENTS

| WO | WO 88/06244 | 8/1988 |
|----|---|---|
| WO | WO 2007/086757 | 8/2007 |
| WO | WO 2007/086759 | 8/2007 |

*Primary Examiner* — David Bochna
*Assistant Examiner* — James A Linford
(74) *Attorney, Agent, or Firm* — Fay Sharpe LLP

(57) ABSTRACT

According to one aspect of the present invention there is provided an adjustable mechanism for connecting two or more shafts, including at least a first shaft having an external surface with an outer diameter and a second shaft which is hollow at a first end, wherein a spring is anchored to the first end of the second shaft, the spring having an inner diameter of similar dimensions to the outer diameter of the first shaft, the spring configured such that when a force is applied to the spring its inner diameter is greater than the outer diameter of the first shaft so that the second shaft can move over the first shaft to a desired position relative to the first shaft, and when the force is no longer applied to the spring it is biased to return to its original inner diameter to bear against the external surface of the first shaft.

21 Claims, 8 Drawing Sheets

(51) Int. Cl.
*B62K 19/24* (2006.01)
*F16B 7/14* (2006.01)
*F16L 37/05* (2006.01)
*A45B 9/00* (2006.01)
*A63C 11/22* (2006.01)
*A63B 53/14* (2015.01)
*A63B 60/22* (2015.01)

(52) U.S. Cl.
CPC ... *A63B 2060/0085* (2015.10); *A63B 2209/08* (2013.01); *A63B 2209/10* (2013.01); *A63B 2210/50* (2013.01); *A63C 11/22* (2013.01); *Y10T 29/49947* (2015.01); *Y10T 403/32467* (2015.01)

(56) References Cited

U.S. PATENT DOCUMENTS

| | | | | |
|---|---|---|---|---|
| 2,032,196 | A | * | 2/1936 | Blake ............... 279/77 |
| 2,690,693 | A | | 10/1954 | Campbell |
| 2,711,331 | A | * | 6/1955 | Temple ............... 285/8 |
| 3,603,623 | A | | 9/1971 | Widman |
| 3,884,508 | A | * | 5/1975 | Jones ............... 285/31 |
| 3,934,315 | A | * | 1/1976 | Millheiser et al. ............ 24/453 |
| 3,967,831 | A | | 7/1976 | Chang et al. |
| 4,083,585 | A | * | 4/1978 | Helm ............... 285/260 |
| 4,099,748 | A | * | 7/1978 | Kavick ............... 285/256 |
| 4,163,573 | A | * | 8/1979 | Yano ............... 285/148.13 |
| 5,365,944 | A | | 11/1994 | Gambale |
| 6,179,514 | B1 | * | 1/2001 | Cheng ............... 403/377 |
| 6,293,594 | B1 | * | 9/2001 | Safarevich ............... A61N 1/05 174/84 R |
| 6,544,231 | B1 | | 4/2003 | Palmer et al. |
| 2008/0008557 | A1 | * | 1/2008 | Bucciero et al. ............ 411/438 |

* cited by examiner

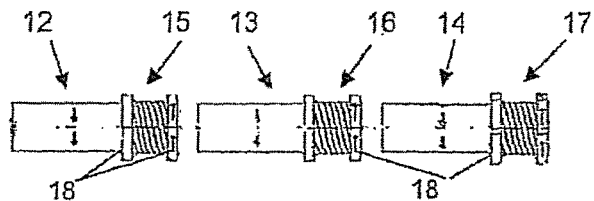
FIG. 3(a)
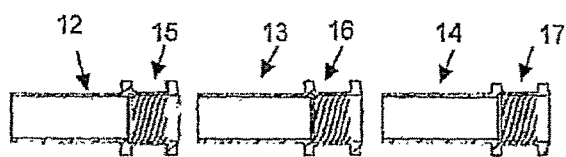
FIG. 3(b)
FIG. 3(e)          FIG. 3(f)
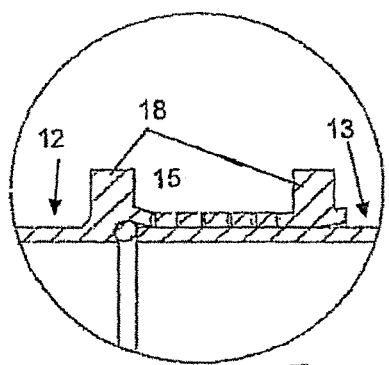 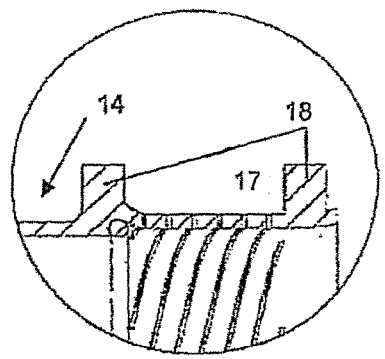
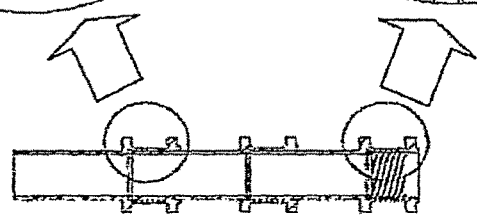
FIG. 3(c)
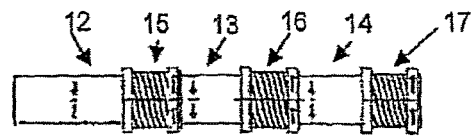
FIG. 3(d)

CONNECTION DEVICE

TECHNICAL FIELD

This invention relates to improvements to connection devices/mechanisms and in particular to adjustable connection mechanisms for connecting two or more shafts.

BACKGROUND ART

There are many situations where there is a need to securely connect elements such as tubes, pipes, rods, shafts and other elements, including the use of fasteners. Current devices/mechanisms are dependant on the application of sufficient force to reliably connect the elements. In addition in use many items are subject to vibration which increases the likelihood of failure.

Failure can be catastrophic in industrial situations where pipes separate or leakage of high pressure gases or liquids occurs. In addition there are many situations where maintenance and inspection is difficult, expensive, or impossible and it would be a considerable advantage to improve the reliability of connection devices. The use of devices to define locking forces is an extra expense. It would be much better if the devices were inherently more tolerant to vibration misalignment and the stresses that exist.

Further there are many instances where an adjustment can be required between two two elements. For example, the game of golf has its own challenges in connection devices in that golfers are of all ages, strengths, abilities, and physiques, which together significantly influence the dynamics of the golfers swing and subsequent ball impact. Therefore golf clubs would be better if they were able to be tailored more easily to suit this variation. To do this a convenient but reliable adjustment connection device is needed.

Golfing is becoming more prevalent among junior golfers, children between approximately five (5) and approximately fourteen (14) years of age. The average height of a five-year old child is forty-four inches (44"). By the time the child reaches fourteen years of age he or she will have grown an additional twenty inches (20") to an average height of sixty-four inches (64"). During these years of growing the child will need to be refitted for golf clubs every one and a half years. If a new set of golf clubs is bought every one and a half years, the expense will be great. If a longer set of golf clubs is not purchased, the child will compensate for the short golf clubs by developing an improper golf swing.

A golf club can be lengthened by removing the grip of the golf club, and then attaching an extender piece to the end of the golf shaft, and then re-gripping the golf club. This can be expensive and time consuming.

An example of an extension for a putter is described in U.S. Pat. No. 5,024,438 to Candow. The putter extension is used in order that the golfer may be at a more upright position when putting. The length of the putter is extended by removing the grip from the putter, placing a receiving sleeve within a cavity that extends longitudinally within the putter shaft, positioning an extension shaft into the receiving sleeve, and placing a grip over the extension shaft. The receiving sleeve is anchored into the putter shaft with an expansion joint. The disadvantage to this type of extension is that the process is both tedious and expensive. Furthermore, this type of extension device is used to extend the length of a putter but is not strong enough to withstand the stresses on a shaft of a driver or an iron resulting from the golf head impacting a golf ball.

Retractable golf clubs are known which allow a person to fold the golf club to a size such that it can be carried in a briefcase. However, this type of golf club is not adjustable to more than one playing length. This golf club is only adjustable to a second length for transporting purposes.

None of the above-mentioned prior art discloses a golf shaft for a golf club that can be adjusted to various playing lengths while being able to withstand stresses resulting from the golf club head impacting a golf ball.

Therefore, there is a need for an adjustable length golf shaft that is capable of handling these stresses and would allow a child to use the same set of golf clubs throughout his or her youth. Alternatively a rigid form grip, which may be repositioned on the shaft, will allow adjustment by the length of the grip.

It would also be an advantage if a golf putter was adjustable for length so the golfer could alter the length to suit their desired posture.

Telescoping golf shafts are described in patents, and the following patents represent the approaches to securing the shafts.

Middleton, U.S. Pat. No. 5,733,203, describes a telescoping putter, with 2 shafts, with a "locking screw" to secure the shaft.

Harrison, U.S. Pat. No. 5,649,870, describes a telescopic shaft arrangement where simple friction secures the two telescoping tapered shafts in a semi fixed position.

Mazzocco, U.S. Pat. No. 4,674,747 discloses a golf club having adjustable length shaft retractable between fully extended and collapsed positions. The golf club has plural concentric telescopic interlocking tubular sections which produce a friction lock between the tubular sections in a fully extended position. There is a club commercially available utilizing this principle (http://www.allinonegolfclub.com).

Sundin, U.S. Pat. No. 5,584,769, describes a shaft which can be constructed of two or more telescopically-adjustable or collapsible members to allow the same to adjust to different lengths for individual golfers. However, Sundin does not specify how the two shafts are to be secured in position.

Lee, U.S. Pat. No. 5,569,096, describes "the shaft inserted into the handle, threadably tightening a locking nut over a flexible ring and a external thread until the flexible ring is squeezed over the shaft prevents the shaft from slipping—thereby effectively locking the shaft in the desired length."

Acculength Golf, www.acculength.com, markets a range of children's golf clubs which use introduced spacers to add length, but the device is not reversible, limited to 5 inches of adjustment, stepwise only, and do not conform with the Rules of Golf for play.

The leading company in specialist children's clubs is US Kids Golf, www.uskidsgolf.com, but this company only has a number of non adjustable length club sets available for children with in a specified height range.

Napolitano, U.S. Pat. No. 5,282,619, describes a shaft which has a number of telescopic sections where a locking nut and a compression ring permit adjacent sections of the telescopic section to be locked in a fixed position relative to each.

Heath et al, U.S. Pat. No. 5,496,029, describes an adjustable golf shaft for a golf club which allows a child to use the same set of golf clubs during childhood and into his or her teen years. This invention uses a compression fitting that can be loosened, the second shaft member can be expanded outward from the first shaft member lengthening the golf shaft, and the compression fitting can be tightened fixing the first shaft member relative to the second shaft member.

U.S. Pat. No. 7,074,135, (to Moore) described:

"An adjustable length golf putter, including at least one shaft, at least one grip attached to the at least one shaft, a self-locking mechanism associated with the putter for lengthwise adjustment of the at least one shaft relative to the at least one grip, the mechanism configured for accommodating an adjustment tool, and being locked by default so that the tool must be engaged in the mechanism for the lengthwise adjustment."

The Rules of Golf do not allow readily made adjustment to clubs, and until May 2002 an adjustable length putter has never been determined as legal by the United States Golf Association.

Puku Ltd, a company in which the applicant is a shareholder, is in receipt of a letter from the United States Golf Association™, which states "the default-locked mechanism submitted has been judged conforming with the Rules of Golf." (letter from the United States Golf Association, April 2002, Decision 2002-185).

This is the first time ever that a length adjustable putter (U.S. Pat. No. 7,074,135) has been approved. The United States Golf Association™ has decided the default locked mechanism submitted can not be inadvertently or secretly adjusted by the golfer during the play of a round of golf.

However none of the above patented inventions or marketed products have addressed how to create an adjustable length club mechanism for putters, but also applicable to clubs other than the putter, which exhibit all the following characteristics:
1. Simple in operation,
2. Economic to manufacture,
3. Offering a variety of length adjustments, continuous or step-wise.
4. Offering reversible length wise adjustments, where a lengthened club can be subsequently shortened, and vice versa.
5. Strong enough to be safe in use, where the swing speed and subsequent mechanical forces are considerable greater than present when using a putter.
6. Strong enough to meet the requirements of the governing bodies of golf (United States Golf Association, USGA, and the Royal and Ancient Golf Club of St. Andrews, R&A)
7. Where the adjustment requires using a specialist tool to operate, also to meet the requirements of the USGA and R&A.

Evidence of the difficulty in meeting the above requirements, other than there being no patents describing how to do so, is that there are no clubs on the market adjustable in length in a continuous or step wise manner.

Other than the afore-mentioned children's brands there are no adjustable length clubs available other than putters. Ping Golf, www.ping.com a leading brand which champions custom fitting of golf clubs to the individual does not have adjustable length clubs, even putters. Neither do www.thomasgolf.com and www.henry-griffitts.com two other brands who claim to specialise in fitting the club to the individual.

To date the USGA and R&A have not sanctioned an adjustable length club other than putters, of which the Moore Puku™ putter is believed to have been the first. It is advantageous to be able to customise the length for all types of golf clubs, to suit the golfer's physique, and preferred posture when playing.

An example of clever use of helices is the well known children's toy, commonly known as the "Chinese Finger Pull" where a helically woven tube (originally bamboo) frictionally locks on each finger inserted into opposite ends of the device. For the purposes of this patent this device may be described as a contra-rotation multiple helix mechanism, or a "Chinese finger helix mechanism (CF_Hx).

A Chinese finger pull device uses the principle that a helical form will reduce in internal and external diameter when a lengthening force is applied. So in the case of a Chinese finger pull the inserted fingers initially slightly expands the device, and creates an initial friction engagement of the fingers to the internal surface of the device. When the fingers are pulled apart the device lengthens and the internal diameter reduces increasing the friction, which means the harder the fingers are pulled the more they are trapped. The solution is not obvious initially but it is to shorten the finger pull thereby increasing the internal bore and allowing the fingers to be removed.

A disadvantage with the Chinese finger pull device (as a connection mechanism) is that generally another person is required to hold the device in a compressed state to enable the fingers to be withdrawn.

An adjustable mechanism for use in adjustment of at least two shafts is disclosed in WO2007/086759 (to Moore). This adjustable mechanism includes a spring attached to a first shaft, the spring having an outer diameter of similar dimension to the internal diameter of a hollow second shaft to which it may be connected in an adjustable manner. The mechanism utilises the fact that the outer diameter of an extended spring is less than the outer diameter of the spring when unextended. Thus by applying a force to extend the spring the outer diameter of the spring can be reduced allowing the spring and first shaft to be moved through the second shaft into a desired position. When the force is removed the spring is biased to return to its unextended form, thus causing the outer surface of the spring to bear against the internal surface of the second shaft to produce a friction fit.

The force required to extend the spring may be provided by a tool which can be engaged with the spring to pull it or rotate it to wind it up (or a combination of both actions), which can reduce the outer diameter of the spring.

This adjustment mechanism, once engaged, can effectively resist a force applied to pull the two shafts apart (due to the friction fit), or to rotate the first shaft relative to the second shaft in the same direction as the winding of the spring (clockwise or anticlockwise) as this action attempts to increase the outer diameter of the spring thus increasing the friction fit.

However, a problem with this type of adjustable mechanism is that the friction fit can be loosened by rotating the first shaft relative to the second shaft in the counter direction to the winding of the spring and pulling the two shafts apart, as this combined action reduces the outer diameter of the spring and therefore reduces the friction fit.

A problem encountered in testing the concepts in this invention is that all parts have manufacturing variability and tolerances. Therefore perfect alignment is almost impossible to attain, and a rattle or vibration can occur between the telescopic elements are together, and it would advantageous if a detail compensated for and reduced the rattle.

Tubular elements are common in industrial and consumer applications, and other than golf there are many situations which would benefit from a relatively simple, strong, reliable, and affordable mechanism which allows connection, possibly telescopic, between two elements. Some examples are pipe work, plumbing, oars and paddles, the frames of a horse racing sulky, and furniture.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Further aspects and advantages of the present invention will become apparent from the ensuing description which is given by way of example only.

DISCLOSURE OF THE INVENTION

This patent describes mechanisms or devices which utilize at least one helical form in novel ways to better connect elements with at least one other device which may also be a helix. This invention relates to improvements to mechanisms which serve to connect, buffer and or align elements, which may telescope, and by way of example this invention is described by reference to golf clubs which may be adjustable in length to suit the golfer's stature and preferred posture, which utilizes a positive-locking fixing mechanism, or a self-locking fixing mechanism, or a defined-force-locking mechanism to secure the elements of the club to a preferred length.

Specifically this invention describes a mechanism, with a first helical detail, which frictionally engages with at least a second part, and resists rotation in one direction, and a second detail which resists rotation in the counter direction. The second detail may also be helical.

Specifically this invention describes a mechanism, with a first helical detail, which frictionally engages with at least a second part, and resists pull forces, and a second detail which resists push forces. The second detail may also be helical.

According to one aspect of the present invention there is provided an adjustable mechanism including at least a first shaft having an external surface with an outer diameter and a second shaft which is hollow at a first end,
wherein a spring is anchored to the first end of the second shaft,
the spring having an inner diameter of similar dimensions to the outer diameter of the first shaft,
the spring configured such that when a force is applied to the spring its inner diameter is greater than the outer diameter of the first shaft so that the second shaft can move over the first shaft to a desired position relative to the first shaft, and
when the force is no longer applied to the spring it is biased to return to its original inner diameter to bear against the external surface of the first shaft.

According to another aspect of the present invention there is provided an adjustable mechanism including at least a first shaft and a second shaft which is hollow at a first end, the hollow having an internal surface with an inner diameter,
wherein a spring is anchored to an end of the first shaft,
the spring having an outer diameter of similar dimensions to the inner diameter of the second shaft,
the spring configured such that when a force is applied to the spring its outer diameter is less than the inner diameter of the second shaft so that the second shaft can move over the spring to a desired position relative to the first shaft, and
when the force is no longer applied to the spring it is biased to return to its original outer diameter to bear against the internal surface of the second shaft, and
wherein the adjustable mechanism includes an anti-rotation device to restrict rotation of the shafts relative to one another when in the desired position.

According to another aspect of the present invention there is provided an adjustable mechanism including at least a first shaft having an external surface with an outer diameter and a second shaft having a hollow at a first end, the hollow having an internal surface with an inner diameter,
wherein a first spring is anchored to an end of the first shaft,
the first spring having an outer diameter of similar dimensions to the inner diameter of the first end of the second shaft,
the first spring configured such that when a force is applied to the first spring its outer diameter is less than the inner diameter of the first end of the second shaft, and
when the force is no longer applied to the first spring it is biased to return to its original outer diameter to bear against the inner surface of the first end of the second shaft, and
wherein a second spring is anchored to the first end of the second shaft,
the second spring having an inner diameter of similar dimensions to the outer diameter of the first shaft,
the second spring configured such that when a force is applied to the second spring its inner diameter is greater than the outer diameter of the first shaft so that the second shaft can move over the first shaft to a desired position relative to the first shaft, and
when the force is no longer applied to the spring it is biased to return to its original inner diameter to bear against the external surface of the first shaft.

According to another aspect of the present invention there is provided a method of holding together at least a first shaft and a second shaft which is hollow at a first end, the hollow having an internal surface with an inner diameter,
the method including the steps of:
a) ensuring a spring is attached to one end of the first shaft; and
b) applying a force to the spring in order to reduce the outer diameter of the spring; and
c) sliding the first end of the second shaft over the reduced diameter spring in order to position the shafts relative to each other in a desired position; and
d) engaging an anti-rotation device to prevent rotation of the shafts relative to one another; and
e) releasing the force from the spring to allow the spring to bias towards its original diameter thereby providing a friction fit through bearing against the internal surface of the second shaft.

According to another aspect of the present invention there is provided a method of holding together at least two shafts including a first shaft having an external surface with an outer diameter and a hollow second shaft having an internal surface with an inner diameter, wherein one end of the first shaft includes a first spring the first spring having an outer diameter of similar dimensions to the inner diameter of the second shaft, the first spring configured such that once force is applied to the first spring its outer diameter is less than the inner diameter of the second shaft, and when force is no longer applied to the first spring it is biased to return to its original outer diameter to bear against the internal surface of the second shaft, and wherein one end of the second shaft includes a second spring the second spring having an inner diameter of similar dimensions to the outer diameter of the first shaft, the second spring configured such that once force is applied to the second spring its inner diameter is greater than the outer diameter of the first shaft so that the second shaft can move over the first shaft to a desired position relative to the first shaft, and when force is no longer applied to the spring it is biased to return to its original inner diameter to bear against the external surface of the first shaft, and wherein the first spring and the second spring are wound in the same direction with respect to the first shaft and the second shaft respectively.

the method including the steps of:

a) applying a force to the first spring in order to reduce the outer diameter of the first spring; and b) applying a force to the second spring in order to increase the inner diameter of the second spring; and c) sliding the second shaft over the reduced diameter first spring in order to position the shafts relative to each other in a desired position; and d) releasing the force from the first spring to allow the first spring to bias towards its original outer diameter, thereby providing a friction fit through bearing against the internal surface of the second shaft; and e) releasing the force from the second spring to allow the second spring to bias towards its original inner diameter, thereby providing a friction fit through bearing against the external surface of the first shaft.

According to another aspect of the present invention there is provided a kitset which includes at least two shafts, at least one of which is hollow at least one end, a spring of a size and configuration so as to closely cooperate with the internal diameter of the hollow end of at least one shaft, wherein the shafts include an anti-rotation device to restrict rotation of the shafts relative to one another when engaged, and a spring engagement tool capable of engaging the spring and applying force to same.

According to another aspect of the present invention there is provided a kitset which includes at least two shafts, at least one of which is hollow at least one end, a spring of a size and configuration so as to closely cooperate with the external diameter of at least one shaft, wherein the shafts include an anti-rotation device to restrict rotation of the shafts relative to one another when engaged, and a spring engagement tool capable of engaging the spring and applying force to same.

According to another embodiment of the present invention there is provided an adjustable connector for connecting two or more shafts, the connector including at least a first connection site and a second connection site, wherein each connection site includes a spring anchored to the connector, each spring configured to alter its dimensions when a force is applied so as to accept one of the two or more shafts, and to form a friction fit against the shaft when the force is removed.

The term shaft as used throughout this specification should be taken very generally and broadly as meaning an element of a structural member which is typically elongate. A shaft may be solid (as in a solid rod) or hollow (as in a tube) and may be formed from rigid or flexible material (eg, a shaft may be (among many other things) a solid metallic rod or a flexible garden hose).

Furthermore, the term shaft may be used to refer to the external surface of a solid or hollow elongate member, or to the internal surface of a hollow elongate member. A shaft may have any cross section, A hollow shaft includes an internal wall. The internal wall is irrespective of the surrounding material. It should therefore be appreciated that the term shaft may include a hole cut through a flat piece of material or plate/engine housing. In this instance the hole acts as the shaft, and contains the necessary internal diameter which allows the present invention to work.

In particular the present invention relates to a mechanism for use with two shafts, at least one of which must be hollow at one end at least. The second shaft is configured to be complementary to the hollow in the first shaft, at least at one end, so that the end of the second shaft may be inserted into the hollow in the end of the first shaft and move freely through the hollow shaft. The second shaft may be solid or hollow without affecting the operation of the adjustable mechanism.

In a preferred embodiment at least one shaft is a hollow length of material, such as a golf club handle. This invention relates to improvements to connection mechanisms, by using at least one first mechanism, which may be helical in form, possibly tapered, with another second mechanism. This second mechanism may be of any form to connect elements including utilizing friction, helical form, threaded elements, tapered detail, glue, magnetic connection, on any other means.

By way of example this invention is described by reference to pipe work and golf clubs.

In one example this invention concerns a golf shaft having a first shaft member which may be telescopically positioned within a second shaft member such that the length of the golf shaft is adjustable and an expansive or compressing means for fixedly attaching the first shaft member and the second shaft member relative to one another at a desired length.

This invention describes mechanisms or devices which utilize at least one helical form in novel ways to better connect elements with at least one other device which may also be a helix to connect elements with a variety of purposes including joining but also sometimes to buffer, align or restrict rotation.

Whilst the examples given herein describe generally circular cross section tubes, shafts or golf shafts, this invention can be applied to elements having other forms and cross sections. For example the term shaft shall be taken to include any item with an internal wall aperture detail so that an engine housing or machine tool holder would be "shafts" if they have an aperture with an internal wall (which gives an opportunity for a frictional interference fit). The term shaft shall also be used to describe a solid element, typically elongate, that may engage or be joined to an element having an internal wall aperture detail. Similarly it may be taken, for the purpose of this patent to be an element which is able to deform and increase its external and/or internal diameter, and may therefore engage with a surface which is adjacent. In other words, a helical detail anchored to a conventional shaft may be considered as part of the shaft.

This invention also applies to connections in the broader sense in that the principle herein may be applied to fasteners, and other connecting mechanisms. Therefore whilst tubular elements are used for illustration, this invention can apply equally to non tubular devices such as solid form helices. This invention could therefore apply to any item which is capable of changing it's external or internal dimension, and has at least one helical detail. The types of helical forms described herein are broadly in several groups:

1. Simple helices (Si_Hx) as in a helical cut tube end;
2. Woven helices (W_Hx) as in the Chinese finger pull, where there are more than two helices, generally woven, and in both clockwise (CW) and anticlockwise (ACW) directions;
3. Solid helices (So_Hx) as in a helical form which has no central thickness and may be visualized as a full thickness structural thread, A solid helix may be visualized by the compression of a worm or auger shape to a shorter length which would create a pitch of the compressed (formerly open) helix;
4. Laminated helices (L_Hx) where two or more helical forms generally overlay, for example an outer helix winding CW and an outer helix winding ACW;
5. Spaced helices (Sp_Hx) where two or more helices are generally coaxially but displaced axially relative to each other, relatively adjacent or remote from each other;
6. Combinations of the above types, or where a helix may be complete or partial along the length of a part.

Any of the above helical forms can be used in cooperation with other mechanical mechanisms, which may be locking or self locking.

A clockwise helical cut in the end of a tube potentially creates a connection mechanism, as it may be wound in an anticlockwise direction over a rod which is slightly smaller in diameter than the internal bore of the tube. When the tube is released the helical cut is biased to return to its original diameter, thus creating a friction fit against the external surface of the rod.

This patent describes a mechanism for connecting elements together where there is a first mechanism (M1_CW) having at least one helical form creating an interference fit which resists rotation in a clockwise direction, and a second mechanism (M2_ACW) which resists rotation in the opposite, anticlockwise, direction. This can be as simple as two tubes where M1_CW has a helical end, and telescopes into the aperture of M2_ACW which also has a a helical end which forms an interference (or friction) fit with the external surface of M2.

By way of example of the novel use of helical form to connect elements this patent will describe their novel use in connecting a water pipe and a golf grip to a shaft.

With water pipes a permanent secure reliable waterproof connection is required. Clever use of a pair of helical forms can achieve this end in a very affordable way. If the end of a first pipe is swaged so as to telescope over the end of second pipe and both ends have a helical cut then with careful detailing the elements will be able to be engaged and lock up via the two helices alone. If both are clockwise helices then each will resist rotation in a different direction:
1. The CW helical end of the first pipe will be external (frictionally engaging on an external surface) and because of the properties of helices it will naturally resist ACW rotation, assisted by an initial slight interference engagement.
2. The CW helical end of the second pipe will be internal (frictionally engaging on an internal surface) and because of the properties of helices it will naturally resist ACW rotation, assisted by an initial slight interference engagement.
3. If these two pipes are moved together with an adequate force the helices will be modified and expand of constrict. There will come a point where the parts are frictionally bound together because the weakness of each helix (in one direction of rotation) will be compensated for by the strength of other helix that direction.

Alternately either of the tubes could be joined by an overlying or internal lock element that has at least one helix and possibly two or more helices. If this lock up element operates on similar surfaces (eg both external or both internal surfaces) then it will require helices which are both wound in opposite sense (ie one CW and one ACW). If on the other hand one spring operates on an internal surface and another on an external surface, then the helices would be better designed to both be CW, or both be ACW, so that each resists rotation in different directions. With this arrangement the rotational motion required to release one of the helices will be opposed by the other helix. In general a tool may be required to release one or other of the helices independently of the other one in order to release the connector.

There are situations where slippage is required in one direction of rotation only and locking up in the counter direction. By choosing the winds a "clutch" mechanism can be achieved.

All helices, including simple, woven, solid, laminated, spaced, may be shortened or lengthened and this may be used to assemble elements, because the internal and internal diameters are altered by length adjustment. So for example a tube (such as a rigid golf grip) could frictionally lock using a helix to an underlying shaft (possibly an underlying golf shaft), and the tube be able to be moved by applying a force which shortens the helix. To meet the Rules of Golf a tool may be required.

Consider an outer element with two spaced helices; there is an opportunity to join elements in a way that requires a specialized tool or even second person to adjust the elements relatively or to disassemble. This gives an extra level of security and in a golf application is likely to require a tool to meet with approval from the authorities that govern the Rules of Golf.

Turning to lathes and machinery a similar benefit could be in a machine tool holder where the helical form could be a chuck or tool holder (to hold a tungsten tool bit for example). A helical form chuck part or other component could be designed to be heated and shrunk over a cooperating part. In this scenario the helical connection would be doubly secure, stronger in one direction, with controlled slippage in the other or the possibility of disengaging the part without using heat Reference throughout this specification will now be made to the use of the present invention in relation to golf putters.

It should be appreciated however that the present invention has applications far beyond this narrow field and while the present invention is especially suited for golf clubs, it can have application in other areas. These areas can include adjustable connectors for pipes (rigid or flexible), ladders, scaffolding and props in building industries, bicycle seat posts, furniture, walking canes, tent poles, machine tool holders/chucks, ski poles and numerous other consumer products. In particular the invention may be readily scaled in size to provide a connection mechanism for very small shafts (where conventional connection devices may be difficult to operate) through to very large shafts—including for example pipes used for an oil pipeline, or columns used to support a structure (building or bridge for example). In these larger versions the adjustable connections of the present invention may allow for a simple connection which can be readily formed and, with appropriate tools, released and be self tightening (against extension of the connection). A significant advantage in all cases may be that an adjustable connection according to the present invention may be very suitable in situations where there is an advantage in a non-rigid connection. As the connection includes at least one spring form the resulting connection may be configured to allow some movement, for example to compensate for movement of the shafts due to changes in temperature (thermal expansion or contraction).

While the present invention will be discussed as connecting together two shafts, it should be appreciated that the present invention can be used to connect together multiple shafts or other devices and two shafts is just given as a simple embodiment of the present invention.

Where the present invention is used for golf clubs, the shafts are envisaged to be of a similar width and type as those from which a traditional golf club is made.

A further example of the versatility of the invention described above can be illustrated by a single spring is in a walking stick where a helical mechanism may be used singularly or with a second mechanism, and where a helical form can allow all the following features:
1. telescopic assembly;
2. disassemble and component exchange;
3. buffering of components to avoid rattle or vibration; and
4. controlled axial spring (length variation) so there is a give feeling in use.

In some embodiments of the present invention a shaft may be split, but in a manner that will still resist the outer forces of the spring therein—thereby still ensuring that a friction fit is achieved.

Any helical detail described herein may be regular in pitch or the pitch may vary.

Whilst helical forms commonly are formed from metal this invention applies to all materials. Many materials, including plastics materials, can be produced in a helical form and may function as a spring.

Throughout this specification the term "spring" may be taken to refer in general to a helical detail or form. A spring may be a coiled spring as commonly visualized (or any of the other helical forms outlined above), attached or integral, or an element, attached or integral, which acts like a spring in some manner, by altering its length and external dimension when subjected to a force.

A common feature of springs is that they are naturally biased to return toward (or to) their natural length and external/internal dimensions when the force is reduced (or removed).

A key feature of a spring as utilized in the present invention is that the external and internal dimensions of a spring are decreased when the spring is extended, and increased when the spring is compressed, compared with the dimensions when the spring is in its normal (zero force) state. These changes in dimensions may occur as a result of pulling or pushing the ends of the spring.

The dimensions may also be changed by rotation of one end of the spring relative to the other. For example, twisting the spring in the same direction as the winding (winding it up) decreases the cross sectional dimensions of the spring, while twisting in the opposite direction (unwinding) increases the cross sectional dimensions.

In particular the external dimensions of a clockwise spring decrease when the spring is rotated in a clockwise manner, and increase when rotated in an anticlockwise manner. Likewise, the external dimensions of an anticlockwise spring decrease when the spring is rotated in an anticlockwise manner, and increase when rotated in a clockwise manner The term "anchored" as used throughout this specification should be taken to include instances where the spring is manufactured independently and subsequently joined to the shaft, as well as instances where the spring is formed integrally with, or cut out of the shaft.

In all embodiments of the present invention the spring depends directly from the end of a shaft. However, this should not be seen as limiting, as the spring may be a separate item capable of attaching to one or both of the shafts in the securing action.

Alternatively, the spring may be formed integrally with, or formed or cut out of the shaft.

If the spring is attached to the shaft, this may be by a number of means.

In one embodiment, the spring may be welded thereto or adhered with an adhesive, or frictionally engaged by winding into the shaft or housing hole as the case may be.

Various embodiments of the present invention incorporate a spring anchored to an end of a shaft, wherein the shaft and spring (when subjected to an appropriate force) may fit either over or into another shaft in order to form either an external or internal friction fit respectively between the shafts when the force is no longer applied to the spring, as well as to combinations of the two.

For brevity and clarity, the following discussion relates to one preferred embodiment, which will be referred to as an external spring connection, in which the spring is attached to a second shaft which is configured to fit over a first shaft so as to form an externally adjustable connection. The reader will appreciate that a similar discussion can be applied to an internal spring connection in which the spring may be attached to the first shaft and fitted into the hollow in the second shaft.

In one preferred embodiment the spring is anchored to a hollow end of the second shaft. The second shaft may have an inner diameter which is greater than the outer diameter of the first shaft. This allows the second shaft (including the spring when forced) to pass over the first shaft. This particular embodiment is most suitable for a telescoping action for the shaft length which is adjustable externally.

The term "similar diameter" should be taken to mean that the spring is capable of having its diameter increased so that the first shaft may be inserted into the spring and second shaft, but once the shaft is in position, the natural inner diameter of the spring is of a size that will bear against the external surface of the first shaft forming a frictional fit, but without substantially deforming same.

Alternatively, it may also be taken to mean that the spring is capable of having its diameter decreased so that the first shaft may be inserted into the spring and second shaft, but once the shaft is in position, the natural outer diameter of the spring is of a size that will bear against the internal surface of the second shaft forming a frictional fit, but without substantially deforming same.

The spring may be made of any dimensions or configurations to enable it to be forced in order to increase its inner diameter to enable insertion of the first shaft, and then upon release reduce to a size that fits over and onto the first shaft.

In a preferred embodiment of the present invention an end of the spring has a greater inner diameter than the inner diameter of the spring at a location away from the end. This may be used to gradually introduce the spring over the first shaft enabling the spring to then gain purchase on the external surface of the first shaft before the smaller diameter part of the spring is introduced thereto.

The inner diameter of the spring may be increased by various means.

In preferred embodiments of the present invention there is provided a spring engagement tool which in use can apply a force to the spring to alter the spring's diameter.

In one embodiment, the end of the spring may be pushed by a spring engagement tool causing the spring to compress and likewise the inner diameter of the spring to increase.

In preferred embodiments a twisting action is applied to the spring causing the spring to wind up or unwind and likewise have its diameter decreased or increased respectively.

The tool may include a handle attached to an elongate shaft, and at the distal end thereof there is a spring engagement mechanism.

Preferably the handle of the tool is of a shape and size that is easy to grasp and exert a twisting or pulling/pushing motion to the shaft of the tool.

The spring engagement mechanism at the end of the tool may come in a variety of forms. In one embodiment of the present invention the spring engagement mechanism is merely a notch in the end of the shaft of the tool. This notch is preferably of a shape and configuration that it can fit over the spring near the end thereof and hold same during a twisting motion.

In some embodiments of the present invention the notch is in the form of a key hole, requiring some force to push the notch over the spring before it is held in a slightly larger recess.

In a preferred embodiment the spring engagement tool is configured to cooperate with a tool engagement detail on the shaft.

In a preferred embodiment the spring engagement tool is a spanner.

The spring cross section may be round, as per normal, or any other shape, such as oval or square.

In a preferred embodiment the adjustable connector includes an anti-rotation device.

An anti-rotation device is any device or mechanism which, when engaged, prevents the two shafts from rotation with respect to one another. This may be beneficial as an attempt to rotate one shaft in a direction to release the friction grip (expand or reduce the spring dimensions for an external or internal fitted spring respectively) is prevented by the anti-rotation device. With the USGA and R&A in mind it is important a tool has to be used to gain enough leverage to disengage the mechanism.

An anti-rotation device may be a cooperating raised ridge on one shaft and a lowered channel on the other shaft, or complementary non-circular cross sections of the two shafts, in each case configured so that, when engaged, they may prevent rotational movement of the one shaft relative to the other.

In a preferred embodiment of the present invention an anti-rotation device for use with an external spring connection on the second shaft is a spring anchored to an end of the first shaft. As the first shaft (in this embodiment) is configured to fit into the second shaft, this shaft including the anchored spring forms an internal spring connection.

In a preferred embodiment the first spring and the second spring are wound in the same direction with respect to the first shaft and the second shaft respectively.

An adjustable connection mechanism including a first shaft forming an internal spring connection into a second shaft forming an external spring connection, in which both springs are wound the same way (ie both clockwise or both anticlockwise) is stable against rotation of the shafts with respect to one another. This is because a rotation to release one of the spring connections is resisted by the other spring connection. (Rotations in the opposite direction are resisted by the spring connection as they tighten the spring against the shaft).

This invention describes an anti rattle or anti vibration lining or detail included, applied, or integral to one of the parts, which is positioned generally between the first inner telescoping element, and it's cooperating outer telescoping element. This could take various forms such as:

1. At least one element does not match in cross section for example is deliberately out of round so as to create a bearing surface. For example one part could include an external cross section which is oval and be designed to be fitted into another part with an internal oval cross section.
2. An elastomeric lining applied to at least one the interface.
3. The use of seated or free buffers such as O rings or washers or tubes.
4. A lining of plastic, or Teflon, or similar tube, or split tube (possibly in a helical form).
5. An extruded detail which bears on a surface in use.
6. One of the tubular elements could be split and need to be opened or compressed to slide ably engage with its cooperating telescopic partner.
7. The above are examples, and other buffering details and components could be used.
8. The buffering element could be between any elements including a mechanism and the part or surface it bears on.

BRIEF DESCRIPTION OF DRAWINGS

Further aspects of the present invention will become apparent from the ensuing description which is given by way of example only and with reference to the accompanying drawings in which:

FIG. 2 shows corresponding views to those of FIG. 1 of the adjustable connection mechanism in accordance with the embodiment shown in FIG. 1 when the adjustable connection mechanism is engaged; wherein FIG. 3 is a diagrammatic view of a pipeline formed by a series of shafts connected by an adjustable connection mechanism. FIG. 3(a) is a schematic side view of three shafts, FIG. 3(b) shows the corresponding cross section through the shafts prior to engagement of the external spring connection mechanisms, the shafts engaged are illustrated in the cross section view of FIG. 3(c), and in side elevation in FIG. 3(d), FIG. 3(e) and FIG. 3(f) depict exploded views of portions of FIG. 3(c); and FIG. 4 is a diagrammatic view of a range of various anti-rotation devices.

FIG. 6 shows diagrammatic views corresponding to those of FIG. 5 for the embodiment of FIG. 5 when engaged, wherein FIG. 6(c) is a diagrammatic perspective view of FIG. 5(c); and.

FIG. 7 is a diagrammatic view of an adjustable connection mechanism in accordance with another embodiment of the present invention wherein FIG. 8 is a diagrammatic view of an adjustable connection mechanism according to another embodiment of the present invention; wherein FIG. 8(c) is an adjustable connector except the springs are wound in the same direction.

BEST MODES FOR CARRYING OUT THE INVENTION

Figure 1A:
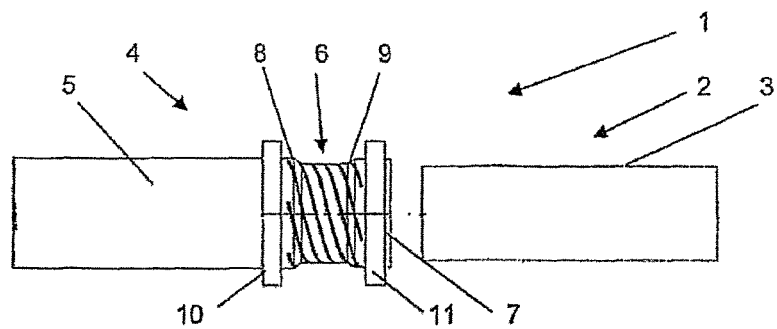
FIG. 1(a) is a diagrammatic view of an adjustable connection mechanism in accordance with one embodiment of the present invention.
Figure 1B:
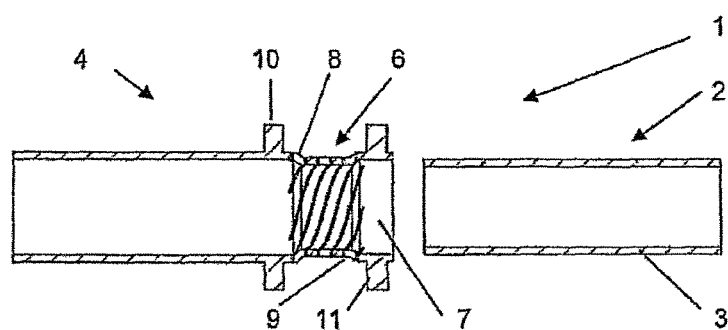
FIG. 1(b) is a diagrammatic cross section view of an adjustable connection mechanism of the embodiment shown in FIG. 1(a)
Figure 1C:
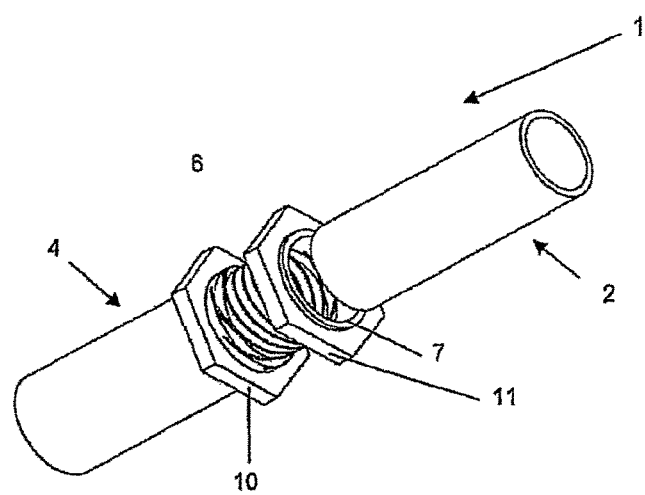
FIG. 1(c) is a diagrammatic view of an adjustable connection mechanism according to the embodiment shown in FIG. 1(a)

An adjustable connection mechanism, in the form of an external spring connection mechanism is generally indicated by arrow 1 in FIG. 1.

The external spring connection mechanism 1 includes a first shaft, generally indicated by arrow 2, in the form of a hollow shaft having an external surface 3 defining an outer diameter of the first shaft 2.

The external spring connection mechanism 1 also includes a second shaft, generally indicated by arrow 4, which is in the form of a hollow tube at a first end 5. The inner diameter of the first end 5 of the second shaft 4 is greater than the outer diameter of the first shaft 2.

A spring 6 is anchored to the first end 5 of the second shaft 4 by forming a helical cut in the second shaft.

As can be seen most clearly in the cross sectional view shown in FIG. 1(b) the inner diameter of the spring 6 is of similar dimension as the outer diameter of the first shaft 2. In preferred embodiments (as shown in FIG. 1) the inner diameter of the spring 6 is slightly less than the outer diameter of the surface 3 of the first shaft 2.

In preferred embodiments the spring 6 does not extend to the free end of the second shaft 4, but is configured as a continuous ring of material to be referred to as a leader 7. A leader 7 configured as a continuous ring of material is less likely to bind against the external surface 3 of the first shaft 2 when engaged than would the case if the helical cuts forming the spring 6 extended to the free end of the second shaft 4.

In this embodiment the inner diameter of the leader 7 is greater than the inner diameter of the spring 6 and of the outer diameter of the surface 3 of the first shaft 2 so that the first shaft 2 can be inserted directly into the leader 7. This means that the spring 6 includes transition sections 8, 9 between the leader 7 and the central part of the spring 6, and again from the central of the spring 6 to the second shaft 4. Thus the inner diameter of the spring 6 at each end is greater than the inner diameter of the spring between the transition sections 8, 9.

The second shaft 4 includes spring engagement details in the form of hexagonal flanges 10, 11. The hexagonal flanges 10, 11 may be engaged with a spring engagement tool(s), in the form of a pair of spanners (not shown) which may be operated to cause a twisting action on the spring 6, either to wind it up or unwind it. Alternatively, a spring engagement tool in the form of a clamp may be used to pull the hexagonal flanges 10, 11 toward each other, or to push them apart. In either case (rotation or changing of length) the internal diameter of the spring is changed by application of the force.

For the embodiment illustrated in FIG. 1, an anticlockwise rotation of the hexagonal flange 10 with respect to the hexagonal flange 11 will cause the clockwise windings of the spring 6 to open, thus increasing the inner diameter of the spring 6. At some point, depending on the characteristics of the spring 6, the inner diameter will be increased sufficiently to allow the first shaft 2 to be inserted through the leader 7, spring 6, and into the hollow interior of the second shaft 4.

Figure 2A:
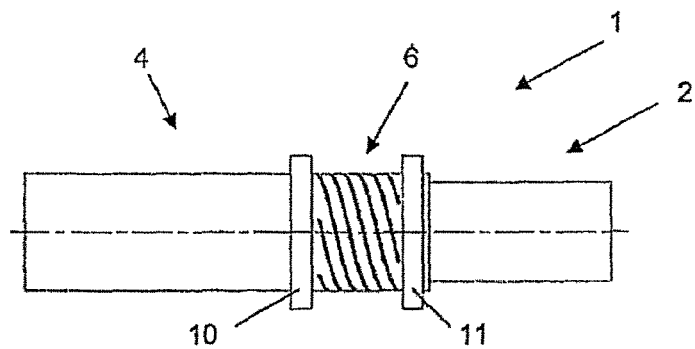
FIG. 2(a) is a diagrammatic view of FIG. 1(a)
Figure 2B:
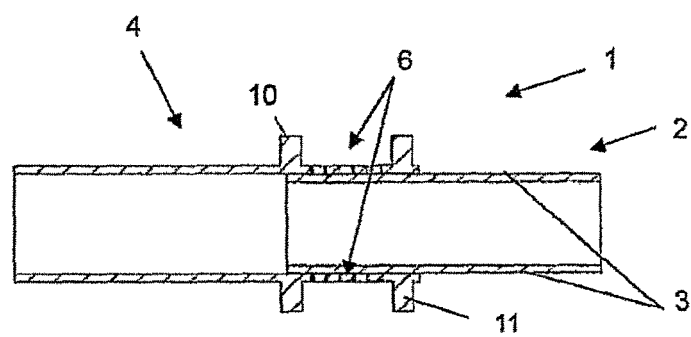
FIG. 2(b) is a diagrammatic cross section view of FIG. 1(b)
Figure 2C:
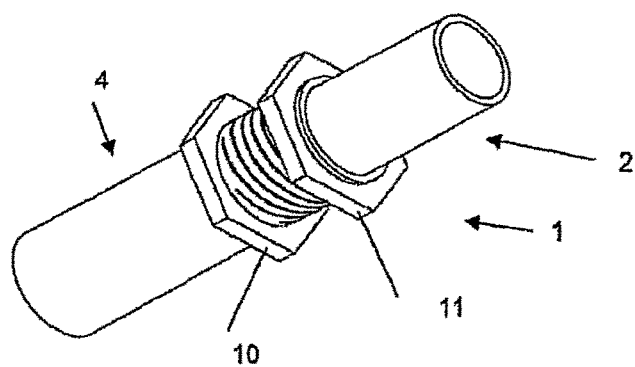
FIG. 2(c) is a diagrammatic view of FIG. 1(c)

The force on the spring 6 is maintained while the first shaft 2 and second shaft 4 are arranged in the desired position relative to one another. Removal of the force holding the spring 6 open allows the spring 6 to relax (due to its natural bias) toward its natural diameter. As the inner diameter of the spring 6, particularly in its central portion, is slightly less than the outer diameter of the external surface 3 of the first shaft 2, the result is that the inner diameter of the spring 6 bears against the external surface 3 creating a friction fit. This is illustrated in FIG. 2 which shows corresponding views to those of FIG. 1 when the external spring connection mechanism is engaged.

FIG. 3 illustrates how three identical hollow shafts, 12-14, each having a spring (15-17 respectively) anchored at one end, may be coupled together to form a pipeline. Each shaft (12-14) also includes a pair of hexagonal flanges 18, one of each pair on either side of a spring 15-17, the hexagonal flanges 18 configured to enable a tool or tools to apply a force to the springs 15-17 so as to increase the internal diameter of the spring 15-17.

FIG. 3(a) is a schematic side view of three such shafts (12-14) and FIG. 3(b) shows the corresponding cross section through the shafts 12-14 prior to engagement of the external spring connection mechanisms.

The external spring connection mechanism in this embodiment is formed by a spring (e.g. 16) and the end of one shaft (e.g. 13) and the end of another shaft (e.g. 14) distal to the spring on that shaft (17).

The inner diameter of the spring 15-17 is similar to, but slightly smaller than, the outer diameter of each shaft 12-14 prior to the application of any force to the spring.

For the embodiment illustrated in FIG. 3 rotation of the hexagonal flanges in the directions indicated by the arrows will lead to an increase of the inner diameter of the spring 15-17 to an extent that an end of the adjacent shaft may be inserted through a leader into the spring 15-17. In this embodiment the adjacent shaft is inserted until it abuts with the inner surface of the shaft anchored to the spring.

The situation with the shafts engaged is illustrated in the cross section view of FIG. 3(c) and in side elevation in FIG. 3(d). FIG. 3(c) also shows magnified views of the coupling arrangement between shafts 12 and 13, and the open end of shaft 14. The right hand detail clearly shows the spring 17 of shaft 14 in its natural (unconnected) state in which the inner diameter of the spring 17 is greater than the internal diameter of the shaft 14, but less than the outer diameter of the shaft 14.

The left hand detail shows the situation (in cross section) when shaft 12 is fully engaged with shaft 13. The inner diameter of spring 15 has been increased (through operation of a tool on the spring engagement details 18) to allow the shaft 13 to be inserted into shaft 12. The detail shows the situation when the force has been removed so that spring 15 bears against the external surface of shaft 13 to make a friction fit between the two shafts. As can clearly been seen on the left hand detail the internal surfaces of the shafts 12 and 13 are aligned when engaged.

In this fashion a pipeline of any length can be constructed from a plurality of hollow shafts, each shaft having a spring anchored to one end. The resulting pipeline will resist any force applied to pull the shafts apart (as this action tightens the spring against the exterior surface of the shaft to which it is engaged) and will also resist any action to rotate neighbouring shafts with respect to one another (as the action to undo one spring connection by rotation of a whole shaft is resisted by the spring connections on either side). Of course, an individual external spring connection mechanism may be opened by use of appropriate tools operating on the spring engagement details 18 to open up that spring and hence release the inserted shaft.

It will be appreciated that connections formed in this manner to join hollow shafts together may have considerable applications in plumbing. A particular advantage is that the connection may be formed readily by twisting or pulling the spring back in order to open the spring (increase the inner diameter) and inserting the second shaft into the spring prior to release of the force on the spring. For many standard plumbing applications this operation could be carried out by hand for example. However, a tool will generally be required to release the connection once formed. Furthermore, unlike many conventional plumbing connectors, the external spring connection mechanism actually tightens automatically when pressure is applied during use.

FIG. 4 shows four pairs of shafts including an anti-rotation device to restrict rotation of the shafts relative to one another when engaged. The anti-rotation devices may be situated in any convenient part of the shaft provided of course that the corresponding parts of the anti-rotation device engage when the shafts are bought together and connected by the adjustable mechanism.

Figures 4A, 4B, 4C, 4D:
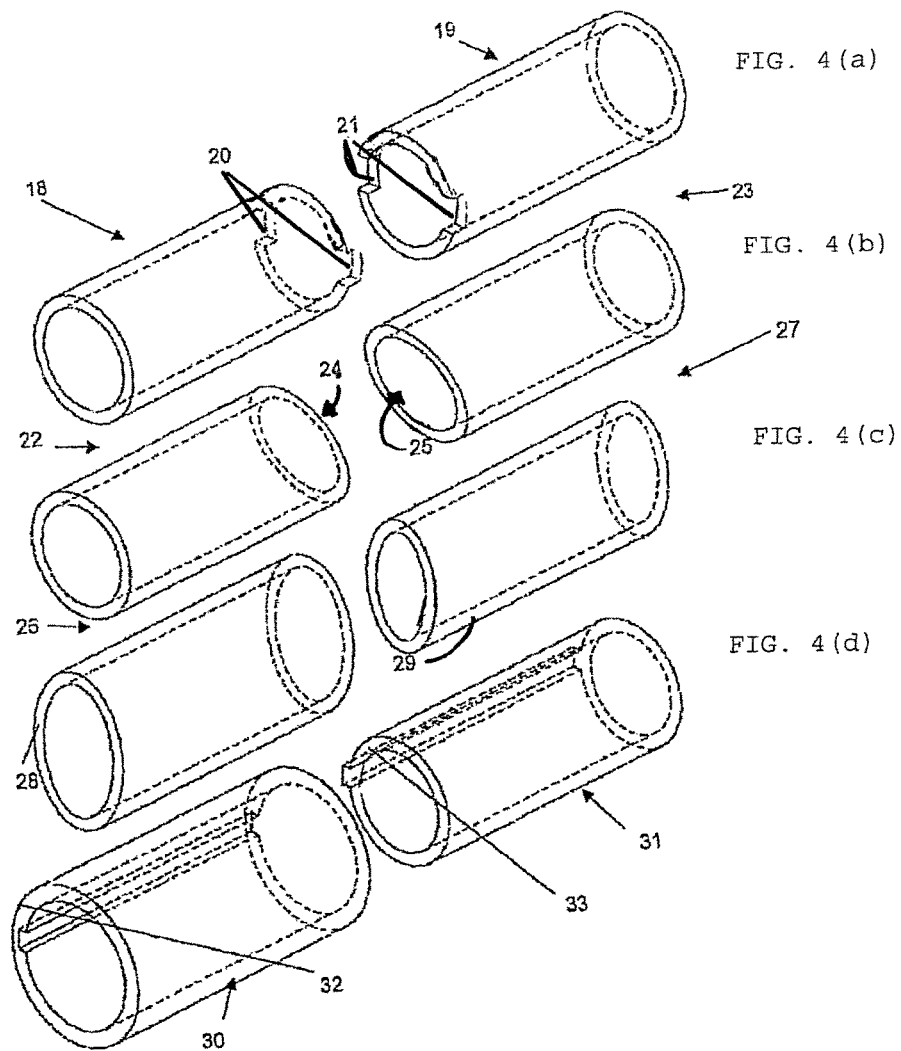
FIG. 4(a) shows two protrusions and corresponding indentations.
FIG. 4(b) shows another anti-rotation device.
FIG. 4(c) shows the anti-rotation device as a non-circular section of each shaft.
FIG. 4(d) shows another anti-rotation device in which an indentation in the form of a groove runs longitudinally along the internal surface of the hollow shaft.

In FIG. 4(a) there are two protrusions 20 on shaft 18 and two corresponding indentations 21 on shaft 19. The protrusions 20 and indentations 21 are such that when shafts 18 and 19 are butted together, a protrusion 20 enters an indentation 21 and prevents rotation of shaft 18 with respect to shaft 19.

FIG. 4(b) shows another anti-rotation device in which the face 24 of shaft 22 is cut at an angle (i.e. not radial). A second shaft 23 has a complementary formed face 25 such that when the two shafts 22 and 23 are butted together, the faces 24 and 25 are aligned in such a way as to resist rotation of one shaft with respect to the other.

In FIG. 4(c) the anti-rotation device is a non-circular section of each shaft. In this instance shaft 29 has a non-circular internal cross section while shaft 27 has a complementary non-circular outer cross section. This arrangement is suitable where shaft 27 is inserted into shaft 29. The non-circular cross section of the shafts 26 and 27 ensures that the shafts cannot be rotated relative to one another when engaged.

FIG. 4(d) shows another anti-rotation device in which shaft 30 includes an indentation in the form of a groove 32 running longitudinally along the internal surface of the hollow shaft 30. The shaft 31 has a corresponding complementary protrusion in the form of a ledge 33 configured to engage in the groove 32 when the shafts 30 and 31 are pushed together such that shafts 31 enters into shaft 30. When the ledge 33 is engaged in the groove 32 rotation of either shaft relative to the other is not possible.

Another embodiment of an adjustable mechanism is illustrated in FIG. 5, in which the adjustable mechanism in the form of an internal/external spring connection mechanism 34 includes a first shaft 35 and a second shaft 36 which is hollow.

A spring 37 is anchored to the end of the first shaft 35, the spring having an outer diameter of similar dimensions to (ie similar by slightly larger than) the inner diameter of the second shaft 36. When a force is applied to the spring 37 the outer diameter is reduced to less than the inner diameter of the second shaft 36.

The second shaft 36 has a spring 38 anchored to the first end. The inner diameter of the second spring 38 is similar to, but slightly smaller than the outer diameter of the first shaft 35.

The first end of the second shaft 36 includes a spring engagement detail in the form of a hexagonal flange 39 which is turned by a spring engagement tool in the form of a spanner (not shown).

Figure 5A:
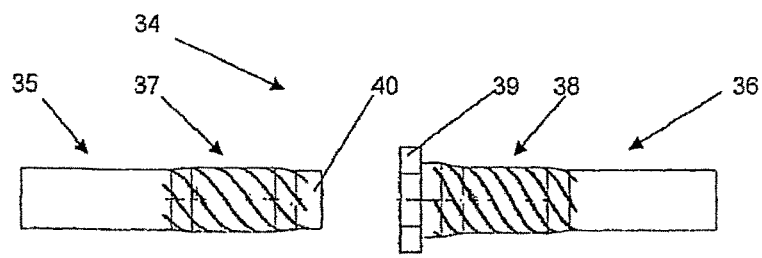
FIG. 5(a) is a diagrammatic view of the components of an adjustable connection mechanism in accordance with another embodiment of the present invention.
Figure 5B:
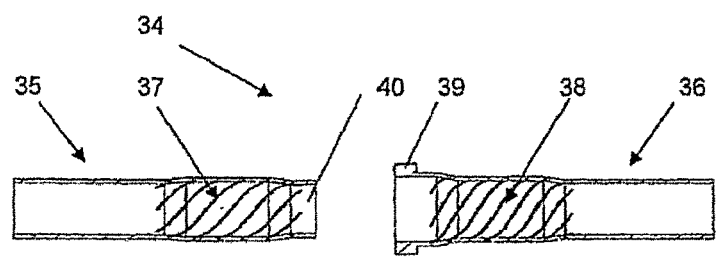
FIG. 5(b) is a cross sectional view of the embodiment shown in FIG. 5(a)
Figure 5C:
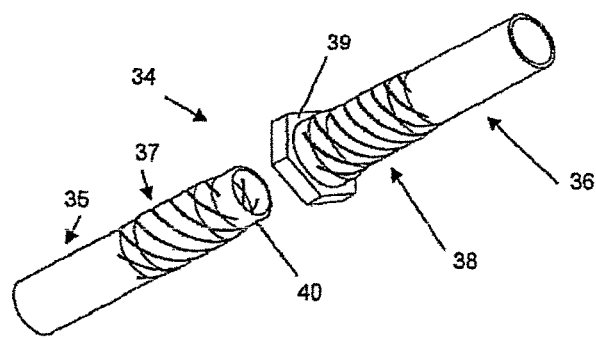
FIG. 5(c) is another view of the embodiment shown in FIG. 5(a)

The components of this internal/external spring connection mechanism 34 are shown in FIG. 5(a) in side elevation, in FIG. 5(b) in cross section and in FIG. 5(c) in a perspective view.

Figure 6A:
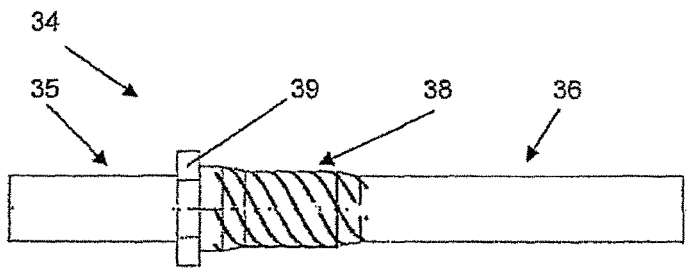
FIG. 6(a) is a diagrammatic view of FIG. 5(a)
Figure 6B:
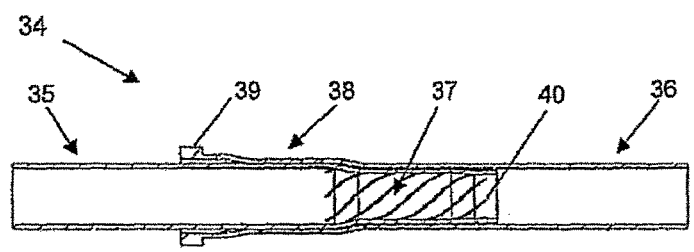
FIG. 6(b) is a diagrammatic cross-section view of FIG. 5(b)
Figure 6C:
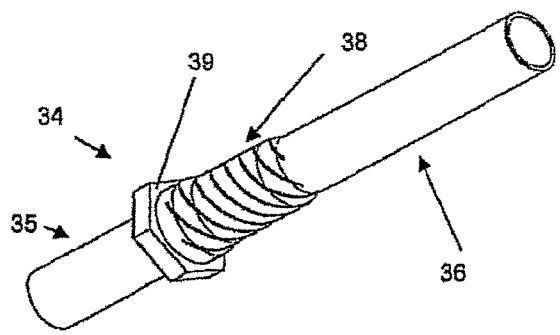

FIG. 6 shows corresponding views of the internal/external spring connection mechanism 34 when the shafts 35 and 36 are engaged.

The method of engagement requires a force to be applied to the spring 38 to increase the inner diameter of the spring 38 to enable the first shaft 35 to be inserted into the interior of the spring 38 and second shaft 36. This motion is facilitated by a leader 40 on the free end of the first shaft 35. The leader 35 is in the form of a solid ring of material of diameter less than the inner diameter of the second shaft 36.

The outer diameter of the spring 37 is reduced by rotation of shaft 35 in a counter clockwise direction (spring 37 is wound clockwise in the embodiment illustrated in FIGS. 5 and 6) which has the effect of opening up the spring 37 which decreases its outer dimension.

When the first shaft 35 is in the desired position in relation to the second shaft 36 the force on the spring 38 is released and spring 38, following its natural bias to return to its original diameter, forms a friction fit against the external surface of the first shaft 35.

The internal/external spring connection mechanism 34 is an example of an adjustable connection mechanism in the form of an external spring connection as described above, including an anti-rotation device in the form of a spring anchored to the first shaft. Or, conversely, it can be considered to be an internal spring connection mechanism as described above including an anti-rotation device in the form of a spring anchored to the second shaft.

Figure 7A:
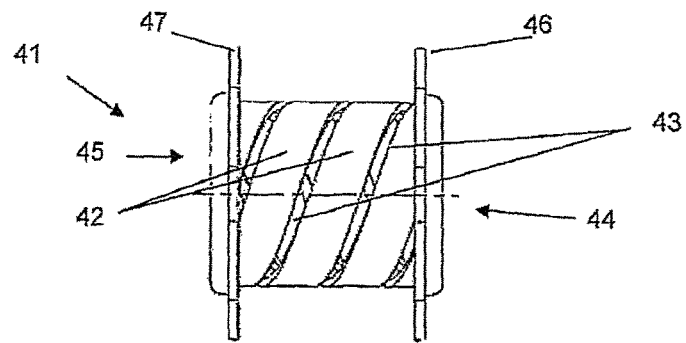
FIG. 7(a) is a side elevation view.
Figure 7B:
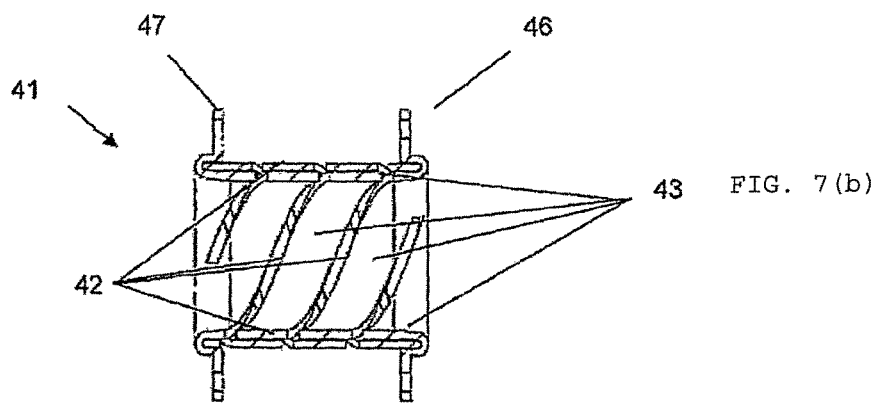
FIG. 7(b) is a side cross section view.
Figure 7C:
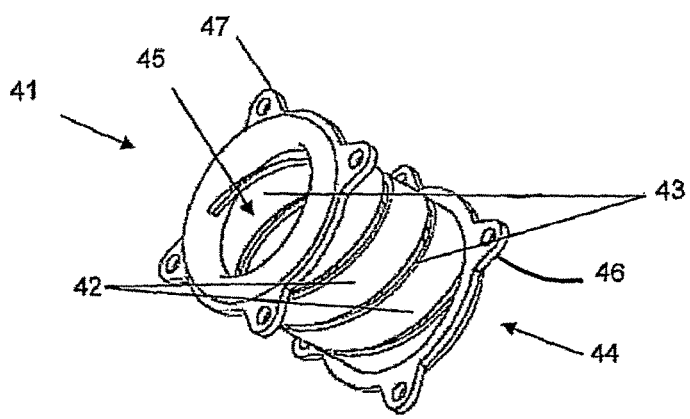
FIG. 7(c) is a perspective view.
Figure 8A:
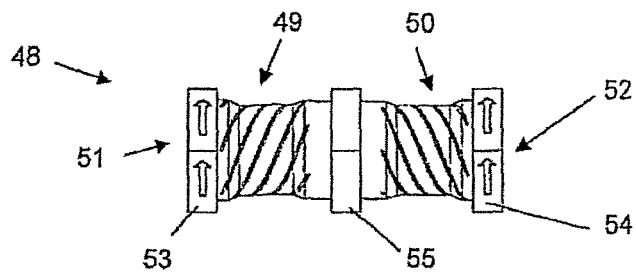
Figure 8B:
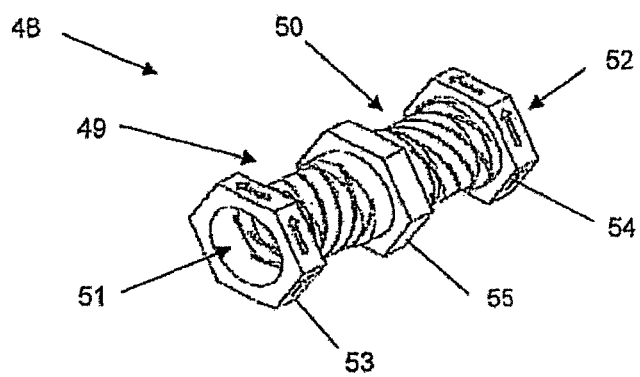
FIG. 8(b) is a perspective view of FIG. 8(a)
Figure 8C:
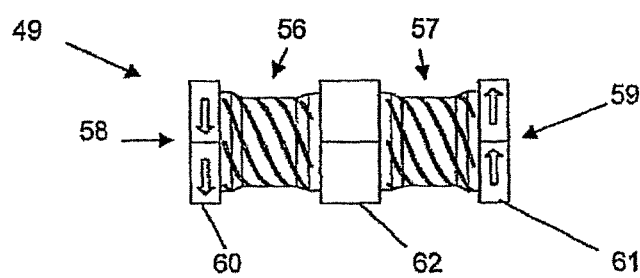
FIG. 8(c) depicts an adjustable connector with the springs wound in opposite directions.
Figure 8D:
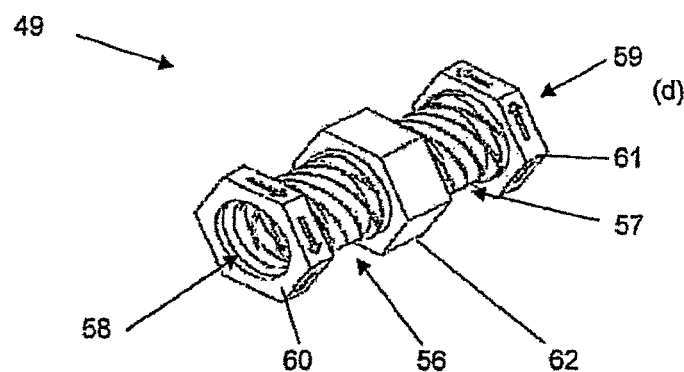
FIG. 8(d) is a perspective view of FIG. 8(c).

An adjustable connector for connecting two or more shafts, according to another embodiment of the present invention is generally indicated by arrow 41 in FIG. 7. In this embodiment two helical springs 42 and 43 are wound over each other, the windings beings in opposite directions. As seen in the illustration in FIG. 7(*a*) from a side the external spring 42 is wound in an anti-clockwise direction while the underlying spring 43 is wound clockwise.

The adjustable connector includes a first connection site 44 and a second connection site 45. The adjustable connector also includes spring engagement details in the form of lugs 46 and 47, these lugs being configured to enable a tool (not shown) to be used to apply a force pulling the lugs 46 and 47 toward one another. This action causes both springs to increase in diameter, thus allowing a shaft to enter through the first and second connection sites 44 and 45.

An advantage of the adjustable connector 41 is that it provides a connection between the two shafts retaining some flexibility due to the springs 42 and 43, but because springs 42 and 43 are wound in opposite directions the connector 41 resists rotation of one shaft relative to the other.

An adjustable connector for connecting two shafts together is generally indicated by arrow 48 in FIGS. 8(*a*) and (*b*). In this embodiment the adjustable connector 48 includes a first connection site 51 and a second connection site 52.

The first connection site 51 includes a first spring 49 which is anchored to the adjustable connector 48. The second site 52 includes a second spring 50 which is also anchored to the adjustable connector 48.

The first connection site 51 also includes a spring engagement detail in the form of an hexagonal flange 53. The second connection site 52 includes another spring engagement detail in the form of an hexagonal flange 54. The adjustable connector 48 also includes a further spring engagement detail in the form of a hexagonal flange 55 located between the first spring 49 and second spring 50.

In the embodiment of an adjustable connector 48 as shown in FIGS. 8(*a*) and 8(*b*) the spring 49 is wound in the opposite direction to the spring 50. The arrows on the hexagonal flange 53 and hexagonal flange 54 indicate the direction of rotation of those flanges with respect to the central hexagonal flange 55 in order to open the first spring 49 and/or the second spring 50 respectively.

A shaft (not shown) may be connected to the adjustable connector 48 at the first connection site 51 by rotating the hexagonal flange 53 with respect to the hexagonal flange 55 in the direction of the arrows on flange 53. This action increases the inner diameter of the first spring 49 allowing the shaft to enter. When the force on the spring is released it relaxes back toward its natural inner diameter creating a friction against the external surface of the shaft inside the spring.

Similarly another shaft (not shown) can be connected to the adjustable connector 48 by opening the second spring 50 by rotating the hexagonal flange 54 with respect to the central flange 55 in a direction shown by the arrows on flange 54. This action has the effect of opening spring 50 increasing the internal diameter and allowing the second shaft to be inserted. When the force on the spring 50 is released, it attempts to return to its normal diameter thus creating a friction fit against the external surface of the second shaft.

In this way the connection sites 51 and 52 may be operated independently of one another to connect or disconnect shafts to the adjustable connector 48.

The adjustable connector 48, when connecting two shafts, is configured to resist rotation of one shaft with respect to the other. This is because rotation of a shaft held in the first connection site 51 in the direction shown by the arrows on flange 53 in order to release the shaft, is resisted by tightening of the second spring 50 (in the absence of any counter force applied to the central flange 55). A similar situation occurs on rotation of the second shaft and the second connection site 52 in order to open spring 50. This is resisted by the action of spring 49 which is tightened by this rotation.

FIGS. 8 (*c*) and (*d*) show a variation on this embodiment of an adjustable connector, generally indicated by arrow 49. This embodiment 49 is similar to that shown in FIGS. 8(*a*) and (*b*) except that in this case the first spring 56 is wound in the same direction as the second spring 57.

Aspects of the present invention have been described by way of example only and it should be appreciated that modifications and additions may be made without departing from the scope thereof as defined by the appended claims.

I claim:

1. A mechanism for connection of two or more shafts in an adjustable position relative to one another, comprising
at least a first shaft having at least a portion which is a rigid tube having an external surface with an outer diameter, and
a second shaft having at least a portion which is a rigid tube and which is hollow at least in a portion at a first end,
wherein a spring is anchored to the first end of the second shaft,
the spring having an inner diameter of similar dimensions to the outer diameter of the first shaft,
the spring configured such that when a force is applied to the spring its inner diameter is greater than the outer diameter of the first shaft enabling the second shaft to be moved over the first shaft to a desired position relative to the first shaft, said hollow portion of the second shaft receiving at least a portion of said first shaft, and
when the force is no longer applied to the spring it is biased to return to its original inner diameter to bear against the external surface of the first shaft,
and wherein the mechanism includes
a second spring anchored to an end of the first shaft, the second spring having an outer diameter of similar dimensions to the hollow portion of the second shaft
to inhibit rotation of the shafts relative to one another when in the desired position.

2. A mechanism as claimed in claim 1 wherein an end of the spring when the force is not applied, has a greater inner diameter than the inner diameter of the spring at a location away from the end.

3. A mechanism as claimed in claim 1 wherein a free end of the spring is configured as a continuous ring of material.

4. A mechanism as claimed in claim 3 wherein said continuous ring of material comprises a spring engagement detail configured to cooperate with a spring engagement tool to apply a force to the spring.

5. A mechanism as claimed in claim 4, wherein said spring engagement detail comprises a flange.

6. A mechanism as claimed in claim 5 wherein said flange includes a plurality of flat walls.

7. A mechanism as claimed in claim 3, wherein said continuous ring of material includes an inner diameter greater than the inner diameter of the spring and the outer diameter of the first shaft.

8. A mechanism as claimed in claim 1, wherein said spring is configured as a helical cut in said rigid tube.

9. A mechanism as claimed in claim 1 wherein the second spring is received within the rigid tube portion of the second shaft.

10. A mechanism as claimed in claim 1 wherein the first and second shafts form one of a golf club, ladder, bicycle seat post, furniture, walking cane, tent pole and ski pole.

11. A mechanism for connection of two or more shafts in an adjustable position relative to one another, comprising:
at least a first shaft comprising a rigid tube, and
a second shaft comprising a rigid tube having a hollow first end, the hollow first end having an internal surface with an inner diameter,
wherein a spring is anchored to an end of the first shaft,
the spring having an outer diameter of similar dimensions to the inner diameter of the second shaft,
the spring configured such that when a force is applied to the spring its outer diameter is less than the inner diameter of the second shaft enabling the second shaft to be moved over the spring to a desired position relative to the first shaft, and
when the force is no longer applied to the spring it is biased to return to its original outer diameter to bear against the internal surface of the second shaft, and
wherein the mechanism for connection comprises a device to inhibit rotation of the shafts relative to one another when in the desired position.

12. A mechanism for connection as claimed in claim 11 wherein the device is a second spring anchored to an end of the second shaft.

13. A mechanism for connection as claimed in claim 11 to wherein an end of the spring has a smaller outer diameter than the outer diameter of the spring at a location away from the end.

14. A mechanism for connection as claimed in claim 11, wherein a free end of said spring is configured as a continuous ring of material.

15. A mechanism for connection as set forth in claim 11, wherein said ring is configured as a helical cut in said rigid tube.

16. A mechanism for connection of two or more shafts in an adjustable position relative to one another, comprising
at least a first shaft comprised of a rigid tube having an external surface with an outer diameter, and
a second shaft comprising a rigid tube having a hollow portion at least at a first end, the hollow portion having an internal surface with an inner diameter,
wherein a first spring is anchored to an end of the first shaft,
the first spring having an outer diameter of similar dimensions to the inner diameter of the first end of the second shaft,
the first spring configured such that when a force is applied to the first spring its outer diameter is less than the inner diameter of the first end of the second shaft, and
wherein a second spring is anchored to the first end of the second shaft,
the second spring having an inner diameter of similar dimensions to the outer diameter of the first shaft,
the second spring configured such that when a force is applied to the second spring its inner diameter is greater than the outer diameter of the first shaft enabling the second shaft to be moved over the first shaft to a desired position relative to the first shaft, and
when the force is no longer applied to the spring it is biased to return to its original inner diameter to bear against the external surface of the first shaft.

17. A mechanism is claimed in claim 16 wherein the first spring and the second spring are wound in the same direction with respect to the first shaft and the second shaft respectively.

18. A mechanism as claimed in claim 16 wherein at least one end of the first spring has a smaller outer diameter than the outer diameter of the first spring at a location away from the end.

19. A mechanism as claimed in claim 16 wherein at least one end of the second spring has a greater inner diameter than the inner diameter of the second spring at a location away from the end.

20. A mechanism for connection as claimed in claim 16 wherein a free end of said first and second spring is configured as a continuous ring of material.

21. A mechanism for connection as claimed in claim 16, wherein said spring is configured as a helical cut in said rigid tube.

* * * * *